United States Patent [19]

Meguriya et al.

[11] Patent Number: 5,401,580
[45] Date of Patent: Mar. 28, 1995

[54] SILICONE RUBBER/UNSATURATED POLYESTER RESIN COMPOSITE MATERIAL AND METHOD FOR MAKING

[75] Inventors: Noriyuki Meguriya; Takeo Yoshida, both of Annaka, Japan

[73] Assignee: Shin Etsu Chemical Co., Ltd., Tokyo, Japan

[21] Appl. No.: 121,476

[22] Filed: Sep. 16, 1993

[30] Foreign Application Priority Data

Sep. 17, 1992 [JP] Japan .................................. 4-273847

[51] Int. Cl.$^6$ ............................................ B32B 13/12
[52] U.S. Cl. ........................................ 428/451; 525/29; 528/24; 264/328.7; 264/328.8; 264/266; 264/259; 427/133; 427/487; 427/387
[58] Field of Search .................. 525/29; 528/24; 264/328.7, 328.8, 266, 259; 428/451; 427/133, 487, 387

[56] References Cited

U.S. PATENT DOCUMENTS 4,376,185  3/1983  Alberts et al. .................. 525/29

*Primary Examiner*—Melvyn I. Marquis
*Attorney, Agent, or Firm*—Millen, White, Zelano & Branigan

[57] ABSTRACT

By curing either one of an organic peroxide-curable silicone rubber composition and an organic peroxide-curable unsaturated polyester resin composition and then curing the other composition while placing it in close contact with the cured composition, there is obtained a composite material in which an organic peroxide-cured silicone rubber is closely and firmly joined with an organic peroxide-cured unsaturated polyester resin.

15 Claims, 1 Drawing Sheet

MIXTURE B

SILICONE RUBBER/UNSATURATED POLYESTER RESIN COMPOSITE MATERIAL AND METHOD FOR MAKING

BACKGROUND OF THE INVENTION

1. Field of the Invention

This invention relates to an integral composite material of silicone rubber and unsaturated polyester resin which is useful in the fields of electric and electronic equipment, business machines, automobiles and precision machines and a method for preparing the same.

2. Prior Art

A number of methods have been proposed for providing a bond between silicone rubber and organic resins. It is known, for example, to form a bond by applying a primer to a surface of molded resin, applying uncured silicone rubber thereto and curing the silicone rubber thereto or by curing self-adhesive silicone rubber compositions to molded resin. For the self-adhesive silicone rubber compositions, a number of proposals have been made on their tackifier component.

As another approach, it is known from Japanese Patent Publication (JP-B) No. 34311/1990 to add an organopolysiloxane containing at least 30 mol % of hydrogen atoms directly attached to silicon atoms to an organic resin whereby the resin is bondable with addition curing type silicone rubber. JP-B 45292/1988 discloses integration by physically fitting silicone rubber within molded organic resin. In Japanese Patent Application Kokai (JP-A) No. 183843/1988, a compound having an aliphatic unsaturated radical and a hydrolyzable radical attached to a silicon atom is grafted to an olefin resin and silicone rubber is bonded and integrated with the grafted olefin resin.

However, several problems arise with these prior art methods for integrating silicone rubber and thermosetting resin into a composite body. The primer method is cumbersome in that a once molded resin shape must be taken out of the mold before the primer can be applied thereto. The method of applying and curing a self-adhesive silicone rubber composition to molded resin has the serious problem that on molding the resin and silicone rubber using a mold, the silicone rubber itself adheres to the mold. In the method of adding hydrogensiloxane to organic resin, the properties of the resin itself can be altered by the addition of siloxane, rendering it difficult to obtain desired properties. The physical engagement method leaves a possibility that the two segments be disengaged by physical forces.

Currently, silicone rubber has found a spreading use in the fields of electric and electronic equipment, business machines, and automobiles because it is recognized to be highly reliable in the aspects of heat resistance, weatherability and electrical properties. To meet such a demand, there is a desire to have composite moldings in which thermosetting resin and silicone rubber are firmly united or bonded together.

SUMMARY OF THE INVENTION

We have found that by selecting an organic peroxide-curable silicone rubber composition as the silicone rubber and an organic peroxide-curable unsaturated polyester resin composition as the thermosetting resin, there can be obtained a composite material in which resin and silicone rubber are firmly integrated. By first curing either one of the organic peroxide-curable silicone rubber composition or the organic peroxide-curable unsaturated polyester resin composition and then curing the other composition while placing it in close contact with the first cured composition, a composite material of integrated silicone rubber and organic resin, which would otherwise be difficult to bond without cumbersome steps like interposition of a primer layer, can be produced in a simple manner within a short time to a practically acceptable bond strength level.

Accordingly, the present invention provides a composite material which is an organic peroxide-cured silicone rubber integrated with an organic peroxide-cured unsaturated polyester resin.

According to the present invention, such a composite material is prepared by first curing either one of an organic peroxide-curable silicone rubber composition or an organic peroxide-curable unsaturated polyester resin composition and then curing the other composition while placing it in close contact with the first cured composition.

BRIEF DESCRIPTION OF THE DRAWING

The only figure.

DETAILED DESCRIPTION OF THE INVENTION

Figure 1:
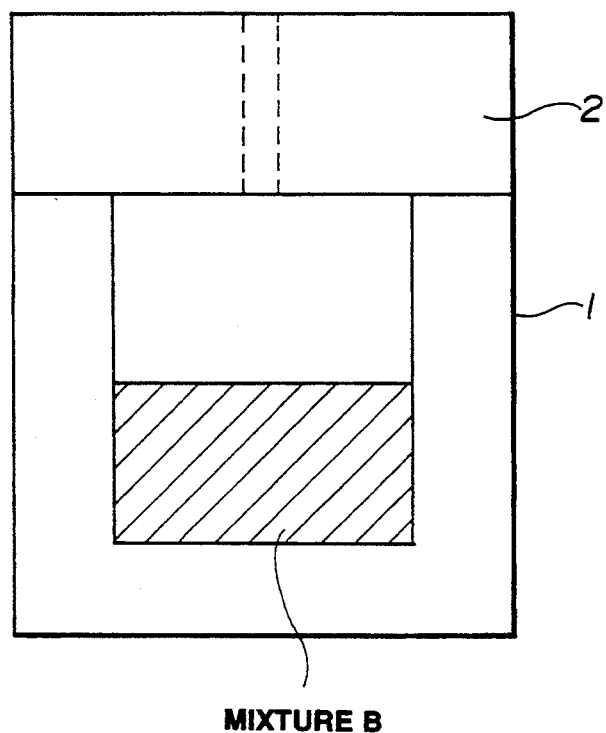
FIG. 1 is a schematic cross-sectional view of a mold used in the Examples and Comparative Examples.

The organic peroxide-cured silicone rubber is obtained from an organic peroxide-curable silicone rubber composition which contains (a) an organopolysiloxane containing on average two or more lower alkenyl radicals in a molecule and (b) a catalytic amount of an organic peroxide as main components and which is liquid or paste at room temperature. By allowing the composition to stand at room temperature or by heating the composition, the cured silicone rubber is obtained as a rubbery elastomer.

Component (a), the alkenyl-containing organopolysiloxane, generally has a viscosity of about 100 to 1,000,000 centipoise at room temperature. It is preferably of the following general formula (1):

$$R_aSiO_{(4-a)/2} \qquad (1)$$

wherein R is a substituted or unsubstituted monovalent hydrocarbon radical, preferably having 1 to 10 carbon atoms. Exemplary of the monovalent hydrocarbon radical are saturated hydrocarbon radicals such as methyl, ethyl and propyl, unsaturated hydrocarbon radicals such as vinyl, propenyl and butenyl, aryl radicals such as phenyl and xylyl, and halo- and cyano-substituted hydrocarbon radicals such as 3,3,3-trifluoropropyl. Although the substituents represented by R may be identical or different, the organopolysiloxane must contain on average two or more unsaturated hydrocarbon radicals in a molecule. Basically the substituents on the silicon atom may be any of the above-mentioned radicals. Preferably the unsaturated radical is vinyl, and methyl and phenyl radicals are desirably introduced as other substituents. Letter a has a value in the range of 1.9 to 2.4. The organopolysiloxane may be either a linear one or a branched one containing $RSiO_{3/2}$ and $RSiO_{4/2}$ units. This organopolysiloxane can be prepared by conventional well-known methods, for example, by effecting an equilibration reaction between an organocyclopolysiloxane and a hexaorganodisiloxane in the presence of an alkali or acid catalyst.

Examples of organopolysiloxane (a) are given below.

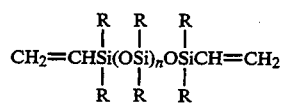

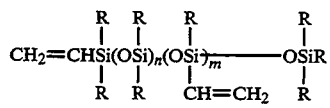

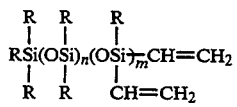

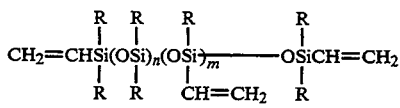

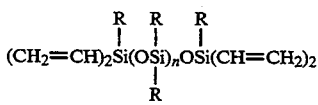

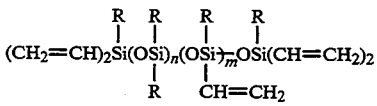

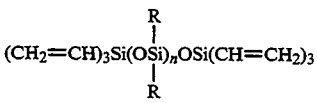

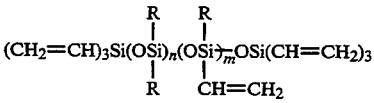

In these formulae, R is as defined above, exclusive of aliphatic unsaturated radicals, and letters n and m are positive integers sufficient to provide a viscosity within the above-defined range.

Component (b), the organic peroxide, is a catalyst for promoting crosslinking reaction of component (a). Illustrative, but non-limiting examples of the organic peroxide are given below.

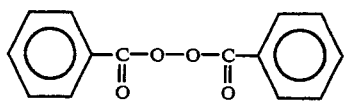
benzoyl peroxide

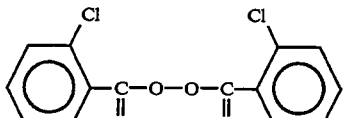
o-monochlorobenzoyl peroxide

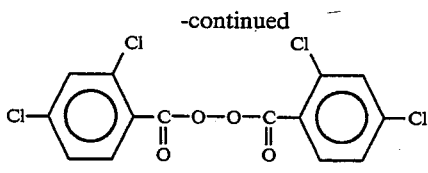
bis-2,4-dichlorobenzoyl peroxide

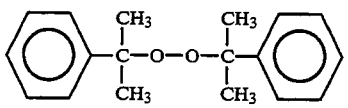
dicumyl peroxide

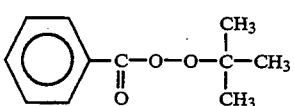
t-butylbenzoate

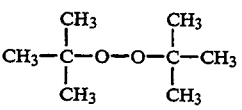
di-t-butyl peroxide

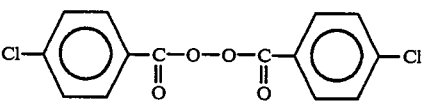
p-monochlorobenzoyl peroxide

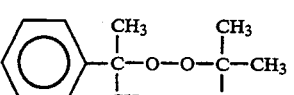
t-butylcumyl peroxide

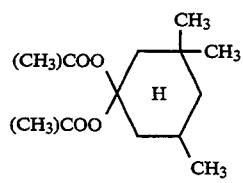
1,1-bis(t-butylperoxy)-3,3,5-trimethylcyclohexane

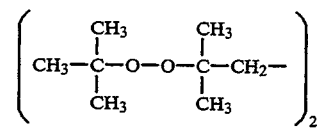
2,5-dimethyl-2,5-bis(t-butylperoxy)hexane

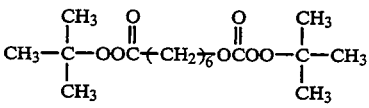
1,6-bis(t-butylperoxycarbony)hexane

The amount of the organic peroxide added may be properly selected in accordance with a desired curing rate although it generally ranges from about 0.1 to 10%, preferably from about 0.2 to 2% by weight based on the weight of component (a).

In addition to components (a) and (b), the organic peroxide-curable silicone rubber composition may contain a filler for the purposes of controlling flow or improving the mechanical strength of molded parts. Exemplary fillers include reinforcing fillers such as precipitated silica, fumed silica, fired silica, and fumed titanium oxide; and non-reinforcing fillers such as ground quartz, diatomaceous earth, asbestos, aminosilicic acid, iron oxide, zinc oxide, and calcium carbonate. The fillers may be used with or without surface treatment with organic silicon compounds such as hexamethyldisilazane, trimethylchlorosilane, and polymethylsiloxane. If desired, the silicone rubber composition may further contain pigments, heat resistant agents, flame retardants, and plasticizers.

With the silicone rubber mentioned above is integrated or united an organic peroxide-cured unsaturated polyester resin. This resin is obtained from an organic peroxide-curable unsaturated polyester resin composition which contains (c) a polyester containing at least one unsaturated radical in a molecule, and
(d) a catalytic amount of an organic peroxide as main components by curing it at room temperature or elevated temperature.

Component (c), the polyester resin having an unsaturated radical, can be prepared by conventional well-known methods. In this case, the amount of the unsaturated radical is preferably in a range of 0.0001 to 0.1 mol/g, more preferably 0.005 to 0.05 mol/g. One typical method involves effecting a condensation reaction among an unsaturated dibasic acid, a saturated dibasic acid and a dihydric alcohol to form a viscous liquid or solid polyester and dissolving a reactive vinyl monomer therein for adjusting the viscosity. The amount of the reactive vinyl monomer may be 1 to 200 parts by weight, preferably 10 to 100 parts by weight per 100 parts by weight of the polyester oligomer. For each of the unsaturated dibasic acid, saturated dibasic acid, dihydric alcohol and reactive vinyl monomer components, any suitable compound may be used. Their preferred examples are given below.

Unsaturated dibasic acid

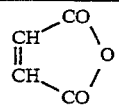
maleic anhydride

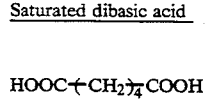
fumaric acid

Saturated dibasic acid

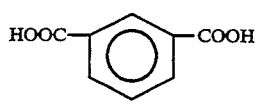
adipic acid    phthalic anhydride

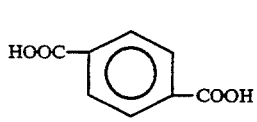
isophthalic acid terephthalic acid

-continued

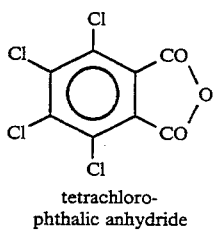
tetrachlorophthalic anhydride

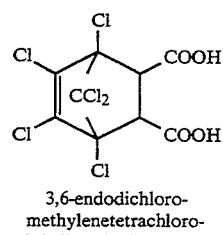
3,6-endodichloromethylenetetrachlorophthalic acid (hetic acid)

Dihydric alcohol

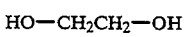
ethylene glycol

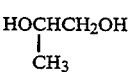
propylene glycol

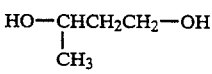
1,3-butylene glycol

diethylene glycol

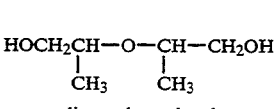
dipropylene glycol

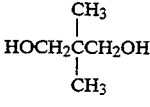
neopentyl glycol

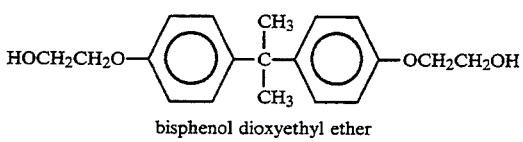
bisphenol dioxyethyl ether

Reactive vinyl monomer

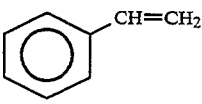
styrene

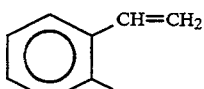
o-chlorostyrene

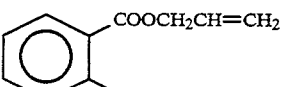
diallyl phthalate

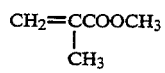
methyl methacrylate

ethyl methacrylate

methyl acrylate

ethyl acrylate

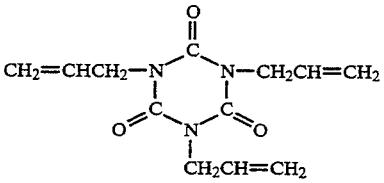
triallyl isocyanurate

-continued

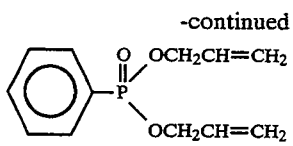

diallylbenzene phosphonate

Component (d), the organic peroxide, is a catalyst for promoting crosslinking reaction of the unsaturated radical of component (c). The amount of the organic peroxide added generally ranges from about 0.1 to 10%, preferably from about 0.2 to 2% by weight based on the weight of component (d) because outside the range complete curing is not expectable in some cases. Illustrative examples of the organic peroxide are given below.

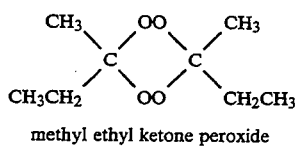

methyl ethyl ketone peroxide

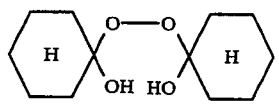

cyclohexanone peroxide

lauroyl peroxide

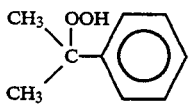

cumene hydroperoxide

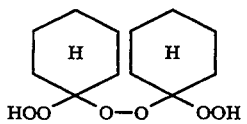

cyclohexane peroxide

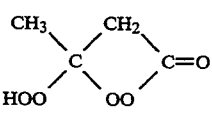

methylacetoacetate peroxide

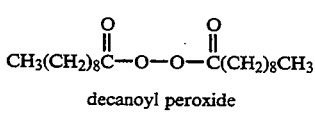

decanoyl peroxide

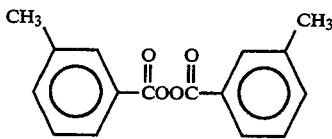

m-toluoyl peroxide

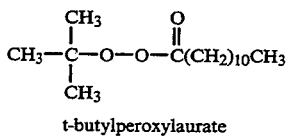

t-butylperoxylaurate

The catalysts which become radical reaction initiators are not limited to the above examples. Particularly when low-temperature curing is required, favorable use is made of peroxides having a low decomposition temperature such as benzoyl peroxide, bis-2,4-dichlorobenzoyl peroxide, and lauroyl peroxide.

In addition to components (c) and (d), the unsaturated polyester resin composition may contain a filler for the purposes of controlling flow, preventing shrinkage on curing or improving the mechanical strength of molded parts. Exemplary fillers include inorganic fillers such as calcium carbonate, clay, talc, silica, asbestos, zinc oxide, and glass fibers and thermoplastic resins such as polymethyl methacrylate and polyethylene terephthalate. If desired, pigments, flame retardants, mold release agents or the like may be blended. Further, reaction promoters such as cobalt naphthenate and dimethylaniline may be blended as co-catalysts.

According to the invention, a silicone rubber/unsaturated polyester resin composite material is prepared by molding and curing either one of the organic peroxide-curable silicone rubber composition or the organic peroxide-curable unsaturated polyester resin composition at room temperature or elevated temperature. Any desired molding method may be used depending on the viscosity of the selected composition. Useful are casting, compression molding, injection molding, extrusion molding and transfer molding. After the primary molded part has been cured, the other composition is placed in close contact with the primary molded part and cured thereto at room temperature or elevated temperature, resulting in an integrated composite body. For the placement of the other composition over the primary molded part, that is, molding of a secondary molded part, any desired molding method may be used depending on the viscosity of the other composition, for example, casting, compression molding, injection molding, extrusion molding and transfer molding. It is to be noted that the start of curing of the secondary molded part need not be after complete curing of the primary molded part. Curing of the secondary molded part can be started after the primary molded part has cured to such an extent that no intermixing occurs between the two parts and an interface is established therebetween. The curing conditions of the silicone rubber composition and the unsaturated polyester resin composition are not limited although the curing temperature is usually room temperature to 200° C. and the curing time is several seconds to several ten minutes.

EXAMPLE

Examples of the present invention are given below by way of illustration and not by way of limitation. All parts are by weight and the viscosity is a measurement at 25° C.

Example 1

To 100 parts of a dimethylpolysiloxane blocked with a trivinylsiloxy radical at each end of it molecular chain and having a viscosity of 1,000 poise were added 30 parts of wet silica having a specific surface area of 200 $m^2/g$, 5 parts of dimethoxydimethylsilane and 1 part of water. The ingredients were heated and agitated for 3 hours at 150° C. To the mixture were added 50 parts of the same polysiloxane as above and 1.0 part of 1,6-bis(t-butylperoxycarboxy)-hexane. This is designated Mixture A.

To 100 parts of an unsaturated polyester resin (Ester GL22 commercially available from Mitsui Toatsu Chemical K. K.) were added 0.5 parts of methyl ethyl ketone peroxide and 0.1 parts of 6% cobalt naphthenate. The ingredients were mixed to give Mixture B.

The mold used herein is illustrated in FIG. 1 as comprising a lower mold section 1 defining a cavity and an upper mold section 2 serving as a lid having an injection port (shown by dashed lines), Mixture B was cast into the cavity of the lower mold section 1 to approximately one-half of its volume. Mixture B was cured by heating at 150° C. for 5 minutes. Then the top opening of the lower mold section was closed by the upper mold section 2 to define a cavity space. Using an injection molding machine, Mixture A was injected into the cavity space or above the cured part B under a pressure of 60 kg/cm². Mixture A was cured by heating at 150° C. for 5 minutes. There was obtained an integral molded product in which the silicone rubber and the polyester resin were firmly joined together. The product could be smoothly removed from the mold, with no sticking to the mold observed.

Example 2

To 100 parts of a dimethylsiloxane raw rubber containing 0.25 mol % of vinyl radicals directly attached to silicon atoms at an end of and within its molecular chain and having a viscosity of 1,000,000 centipoise were added 40 parts of dry silica having a specific surface area of 200 m²/g and 8 parts of dimethylpoly-siloxane blocked with a hydroxydimethylsiloxy radical at each end of its molecular chain and having an average polymerization degree of 20. The ingredients were heated and agitated for 2 hours at 170° C. To the mixture was added 1.0 part of 1,6-bis(t-butylperoxycarboxy)hexane. The mixture was roll milled and is designated Mixture C.

Mixture B of Example 1 was press molded at 150° C. and 30 kg/cm² for 5 minutes into a sheet of 2 mm thick. The sheet was placed in a mold cavity having a spacing of 6 mm. Mixture C was similarly press molded on the sheet, that is, at 150° C. and 30 kg/cm² for 5 minutes. There was obtained a composite sheet in which the silicone rubber and the polyester resin were firmly joined together.

Comparative Example 1

To 100 parts of a dimethylpolysiloxane blocked with a vinyldimethylsiloxy radical at each end of its molecular chain and having a viscosity of 100 poise were added 30 parts of wet silica having a specific surface area of 200 m²/g, 5 parts of dimethoxydimethylsilane and 1 part of water. The ingredients were heated and agitated for 3 hours at 150° C. To the mixture were added 50 parts of the same polysiloxane as above, 0.4 parts of a dimethylsiloxane copolymer blocked with a trimethylsilyl radical at each end (dimethylsiloxane unit 50 mol %, methylhydrogensiloxane unit 50 mol %, viscosity 10 centistokes), and 0.1 parts of an isopropanol solution of chloroplatinic acid (platinum content 0.5% by weight). This is designated Mixture D.

By following the same procedure as in Example 1, the unsaturated polyester resin (Mixture B) was cured in a mold and Mixture D was then injected into the mold and cured at 150° C. for 5 minutes. However, no bond was established between the silicone rubber and the unsaturated polyester resin. They readily separated from each other when the product was removed from the mold.

Comparative Example 2

Into the lower mold section 1 of FIG. 1, polyethylene terephthalate (Kaneka Hyperlite commercially available from Kanegafuchi Chemical K. K.) was injected at a cylinder temperature of 250° C. and an injection pressure of 80 kg/cm² to approximately one-half of the mold cavity volume. By following the same procedure as in Example 1, Mixture A was injected and cured. However, no bond was established between the silicone rubber and the polyester resin. They readily separated from each other when the product was removed from the mold.

There has been described an integral composite material in which silicone rubber and polyester resin are closely joined together and which is useful as parts of electric and electronic equipment, business machines, automobiles and precision machines, for example, gaskets, switches, and connectors. The method of the invention can produce a firmly integrated silicone rubber/polyester resin composite material in a simple manner within a brief time without resorting to primers and adhesives.

Although some preferred embodiments have been described, many modifications and variations may be made thereto in the light of the above teachings. It is therefore to be understood that within the scope of the appended claims, the invention may be practiced otherwise than as specifically described.

We claim:

1. A composite material comprising an organic peroxide-cured silicone rubber part and an organic peroxide-cured unsaturated polyester resin part bonded together at an interface between the parts without the use of a primer between the parts.

2. The composite material of claim 1, wherein the organic peroxide-cured silicone rubber part is obtained by curing an organic peroxide-curable silicone rubber composition comprising
   (a) an organopolysiloxane containing on average two or more lower alkenyl radicals in a molecule and
   (b) a catalytic amount of an organic peroxide.

3. The composite material of claim 2, wherein the organopolysiloxane (a) has a viscosity of 100 to 1,000,000 centipoise at room temperature and the following average compositional formula (1):

$$R_aSiO_{(4-a)/2} \tag{1}$$

wherein R is a substituted or unsubstituted monovalent hydrocarbon radical having 1 to 10 carbon atoms and a is from 1.9 to 2.4 with the proviso that the organopolysiloxane contains on average two or more lower alkenyl groups.

4. The composite material of claim 3, wherein the R groups in the organopolysiloxane are methyl, ethyl, propyl, vinyl, propenyl, butenyl, phenyl, xylyl or 3,3,3-trifluoropropyl groups.

5. The composite material of claim 1, wherein the organic peroxide-cured unsaturated polyester resin part is obtained from an organic peroxide-curable unsaturated polyester resin composition comprising
   (c) a polyester containing at least one unsaturated radical in a molecule, and
   (d) a catalytic amount of an organic peroxide.

6. The composite material of claim 5, wherein the polyester contains 0.0001 to 0.1 mol/g of at least one unsaturated radical.

7. The composite material of claim 5, wherein the polyester having an unsaturated radical is prepared by a condensation reaction among an unsaturated dibasic acid, a saturated dibasic acid and a dihydric alcohol.

8. A method for preparing a composite material comprising distinct parts of an organic peroxide-cured silicone rubber and an organic peroxide-cured unsaturated polyester resin which comprises:

providing an organic peroxide-curable silicone rubber composition and an organic peroxide-curable unsaturated polyester resin composition, curing one of the organic peroxide-curable silicone rubber composition or organic peroxide-curable unsaturated polyester resin composition to obtain a first cured part, placing the other organic peroxide-curable silicone rubber or organic peroxide-curable unsaturated polyester resin composition in physical contact with the first cured part, creating an interface without intermixing of the first cured part and the other composition and without applying a primer between the first cured part and the other composition, and curing the other organic peroxide-curable silicone rubber or organic peroxide-curable unsaturated polyester resin composition, thus forming a bond at the interface between the parts.

9. A composite material comprising distinct parts of an organic peroxide-cured silicone rubber and an organic peroxide-cured unsaturated polyester resin prepared by the method of claim 8.

10. The method of claim 8, wherein the curable silicone rubber composition comprises (a) an organopolysiloxane containing on average two or more lower alkenyl radicals in a molecule and (b) a catalytic amount of an organic peroxide.

11. The method of claim 10, wherein the organopolysiloxane (a) has a viscosity of about 100 to 1,000,000 centipoise at room temperature and the following average compositional formula (1):

$$R_a SiO_{(4-a)/2} \tag{1}$$

wherein R is a substituted or unsubstituted monovalent hydrocarbon radical having 1 to 10 carbon atoms and a is from 1.9 to 2.4 with the proviso that the organopolysiloxane contains on average two or more lower alkenyl groups.

12. The method of claim 11, wherein the R groups in the organopolysiloxane are methyl, ethyl, propyl, vinyl, propenyl, butenyl, phenyl, xylyl or 3,3,3-trifluoropropyl groups.

13. The method of claim 8, wherein the organic peroxide-curable unsaturated polyester resin composition comprises (c) a polyester containing at least one unsaturated radical in a molecule, and (d) a catalytic amount of an organic peroxide.

14. The method of claim 13, wherein the polyester contains 0.0001 to 0.1 mol/g of at least one unsaturated radical.

15. The method of claim 10, wherein the polyester resin having an unsaturated radical is prepared by a condensation reaction among an unsaturated dibasic acid, a saturated dibasic acid and a dihydric alcohol.

* * * * *